United States Patent [19]

Scherer

[11] 4,239,390
[45] Dec. 16, 1980

[54] METHOD OF OBTAINING HIGH RESOLUTION LIGHT SCATTERING SPECTRA

[75] Inventor: James R. Scherer, Berkeley, Calif.

[73] Assignee: The United States of America as represented by the Secretary of Agriculture, Washington, D.C.

[21] Appl. No.: 35,965

[22] Filed: May 4, 1979

[51] Int. Cl.³ ............................. G01J 3/44; G01J 3/30
[52] U.S. Cl. ................................. 356/307; 356/301; 356/326
[58] Field of Search ..................... 356/301, 323–325, 356/327, 326, 341–343, 307

[56] References Cited
U.S. PATENT DOCUMENTS
3,874,799  4/1975  Isaacs et al. ...................... 356/323

Primary Examiner—F. L. Evans
Attorney, Agent, or Firm—M. Howard Silverstein; David G. McConnell; Theodore J. Leitereg

[57] ABSTRACT

High resolution scattering spectra are obtained from irradiation of a sample with monochromatic light without disturbing the position of the sample, the spectra being characterized by freedom from artifacts due to the presence of optical components which distort the intensities of the scattered spectra. Scattered light from an irradiated sample and light from a white light source of constant or known emissivity are passed through the optical components and dispersed and measured with a monochromator and detector. The so-measured light intensities of the scattered light from the irradiated sample and the light from the white light source are ratioed at each wavelength to yield a light intensity representative solely of the scattered light from the irradiated sample, which is then displayed as a function of wavelength.

11 Claims, 3 Drawing Figures

METHOD OF OBTAINING HIGH RESOLUTION LIGHT SCATTERING SPECTRA

BACKGROUND OF THE INVENTION

1. Field of the Invention

This invention relates to and has among its objects the provision of novel methods for obtaining high resolution light scattering spectra such as those found in Raman spectroscopy. It is a particular object of the invention to secure these spectra free of artifacts due to the presence of optical components which distort the intensities of the scattered spectra. Further objects of the invention will be evident from the following description.

2. Description of the Prior Art

A spectrum is a display of the intensity of emitted light as a function of some varying characteristic, for example, wavelength, frequency, energy, etc. Spectroscopy is the study of the dependence of spectra on molecular structure and has proven to be a powerful investigative force in probing the mysteries of the natural universe in chemistry, physics, biology, and the like, and also in everyday uses in hospitals, crime detection bureaus, mines, factories, and so forth.

Spectroscopy is generally divided into sub-groups on the basis of wavelength or the type of excitation experienced by the molecule or atom irradiated. For example, Microwave spectroscopy studies rotational excitation of molecules; Infrared and Raman, vibrational and rotational changes; Ultraviolet and visible, electronic excitation accompanied by vibrational and rotational changes; and Nuclear magnetic resonance, excitation of magnetic atomic nuclei in a magnetic field induced by radio-frequency radiation.

A spectrometer, in the general sense, is an instrument that can produce a spectrum. Most spectrometers contain three elements: entrance and exit slits, a dispersing device to separate scattered light according to wavelength, and a suitable detection system to measure the light intensity as a function of wavelength. In Raman spectroscopy the sample to be studied is usually irradiated with a monochromatic high intensity light source (usually a laser) and the scattered light is imaged by a light collection lens on the entrance slit of a monochromator.

When molecules are irradiated, energy may be transmitted and absorbed as well as scattered. In addition, artifacts or anomalous light intensity may be present due to imperfections in optical components employed in the monochromator. These artifacts can obscure or interfere with the intensities of the scattered light spectrum, particularly in the portion of the spectrum near the wavelength of the laser.

The aformentioned artifacts can be avoided by first taking a spectrum from an irradiated sample, through an optical filter that removes intense Rayleigh scattering (at the same wavelength as the laser source), removing the sample, and then taking a spectrum from a white light source through the same optical filter. The two spectra can be ratioed to yield a spectrum from the irradiated sample free of artifacts from the optical filter and subsequent optics (monochromator, detector, etc.). This procedure works well if the measured scattered intensity varies slowly with wavelength. However, in cases of large intensity variations over a small wavelength range, e.g., high resolution spectrometry, the wavelength reproducibility of successive scans is not sufficiently good to ratio out artifacts. Reproducibility between scans must be of the order of 0.01 wavenumbers (cm$^{-1}$) to obtain removal of artifacts, and known instruments do not possess this degree of reproducibility.

SUMMARY OF THE INVENTION

I have found that excellent removal of artifacts can be obtained in high resolution scattering spectra without disturbing the position of the irradiated sample. In my method, scattered light from the irradiated sample and light from a white light source of constant or known emissivity are passed through the same optical components and dispersed (or diffracted) into a plurality of wavelengths. Then, the light intensities of the scattered light from the irradiated sample and the white light source are alternately measured at each wavelength. The so-measured light intensities from the irradiated sample and white light source are ratioed to yield a light intensity at each wavelength representative solely of the scattered light from the sample, which is displayed as a function of wavelength to yield a spectrum free from artifacts or absorptions inherent in the optical components, e.g., optical filter, monochromator, detector, etc.

An apparatus in accordance with my method comprises means for irradiating a sample with monochromatic light to produce scattered light, means for collecting the scattered light from the irradiated sample, a white light source of constant or known emissivity, means for passing the scattered light from the irradiated sample and the light from the white light source through the optical components, means for dispersing into a plurality of wavelengths the scattered light and the light from the white light source, means for alternately measuring at each wavelength the intensities of the scattered light from the sample and the light from the white light source, means for ratioing the so-measured light intensities from the sample and from the white light source to yield a light intensity at each wavelength representative solely of the scattered light from the irradiated sample, means for storing the ratioed light intensities, and means for displaying the so-ratioed light intensities as a function of wavelength.

The primary advantage of my method and apparatus is that excellent high resolution spectra free of artifacts can be obtained without changing the position of the irradiated sample. Thus, the cumbersome procedures employed in known methods and instruments are avoided by the present invention.

DESCRIPTION OF THE PREFERRED EMBODIMENTS

Figure 1:
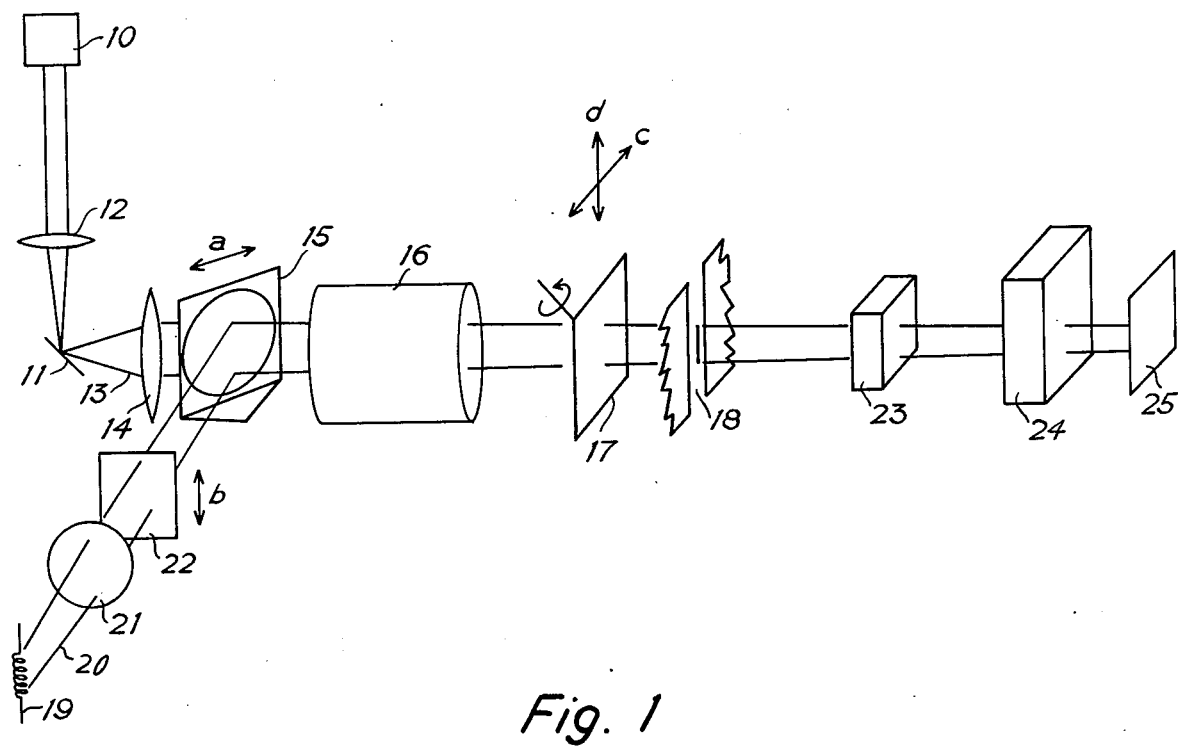
FIGS. 1 and 2 are diagrammatic sketches depicting the arrangement of optical components in accordance with the apparatus and method of the invention.

The method and apparatus of the invention are next described in detail with reference to the annexed drawings. Irradiation source 10 is focused on sample 11 by means of lens 12. Source 10 may be any high intensity monochromatic light source such as that provided by an optical laser. Lens 12 is conventional in the art and is selected for its freedom from optical aberrations. The light from 10 is focused on sample 11 and scattered light 13 from the sample is directed to conventional light collection lens 14. Referring now to FIG. 1 the scattered light is passed through polaroid beam combiner 15, which is positioned at an angle approximately 45 degrees to the optic axis. Beam combiner 15 comprises polarizing film on one side of a plastic substrate. Usually, the polarizing film faces lens 14; however, successful practice of the invention is also obtained if the plastic substrate is oriented facing 14. The scattered light passing through 15 is next directed to optical filter 16 designed to attenuate the intensities of light at the exact excitation frequency. For example, in Raman spectroscopy it is known that attenuation of grating ghosts due to intense Rayleigh scattering can be accomplished by the use of a cell containing hot iodine vapor as an optical filter. Other examples of optical filters which may be employed in the invention will be evident to those skilled in the art.

The light from 16 is intercepted by a computer controlled analyzer 17 such as described by Kint et al. in *Applied Spectroscopy*, Vol. 30, No. 3, pages 281-287 (1976). Usually, 17 acts as an analyzer of polarized light. In the embodiment of the invention depicted in FIG. 1, 17 is employed as a channel selector; it allows the scattered light passing through 16 to enter monochromator slit 18 when the pass polarization is horizontal (represented by $\rightleftarrows c$) and blocks the scattered light when the pass polarization is vertical ($\rightleftarrows d$).

White light source 19 emits light 20 which is passed through apertured lens 21. White light source 19 should have constant or known emissivity and it is within the scope of the invention to employ other sources of constant or known emissivity in the instant invention. Light 20 exiting lens 21 must be polarized and such polarization is obtained by passing 20 through polarizer 22. Light 20 both passes through (lost light) and is reflected by 15 into optical filter 16. Since the intensity of the light from 19 is generally quite high, the light reflected by 15 has sufficient intensity to permit proper ratioing with light 13 from sample 11 so that artifacts due to optical components following 15 are removed from the final spectrum. Analyzer 17 intercepts white light 20 in the following manner. When 17 is vertical, light 20 passes to slit 18; however, when 17 is horizontal (thus, passing scattered light 20 as described above) light 20 is rejected.

Scattered light 13 and white light 20, intercepted on a selective basis by 17, is passed through slit 18 at the entrance to a monochromator which disperses or diffracts the light into conventional detector 23. The latter (23) measures the intensity of the diffracted light at each wavelength setting of the monochromator. Computer 24 reads the intensity of light reaching detector 23. The intensity data are stored in the computer and ratioed at each wavelength to remove artifacts and yield a light intensity representative solely of the scattered light from the irradiated sample. The light intensity ratioed at each wavelength is then displayed at 25 in the form of a spectrum.

Figure 2:
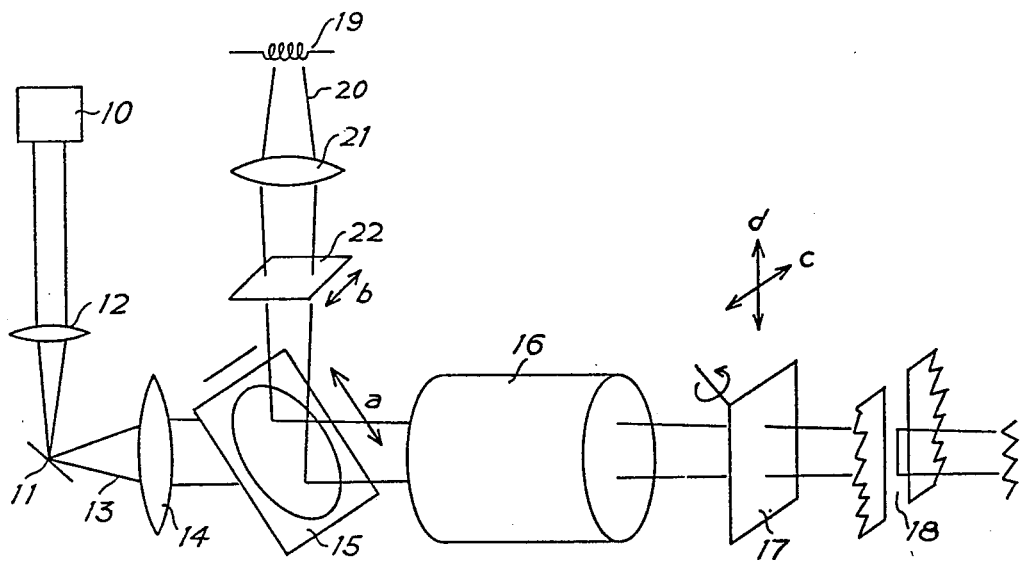

The embodiment of the invention depicted in FIG. 1 allows measurement of the horizontally polarized component of scattered light 13. The vertical component of 13 is measured by the arrangement shown in FIG. 2 wherein beam combiner 15 is rotated by 90 degrees about the optic axis maintaining, of course, an angle of approximately 45 degrees between the combiner plane and the optic axis. In addition, the polarization orientation of 22 is changed from vertical (in FIG. 1) to horizontal. Changing orientation of 15 and 22 presents no problem, however, since such procedures are conventional in the art.

An alternate method of measuring the vertical components of scattered light 13 is the following: Referring to FIG. 1, the polarization of beam combiner 15 is changed to vertical and the polarization of 22 is changed to horizontal. An artifact free spectrum is obtained by ratioing the light intensity when 17 is vertical (light from the sample) to the intensity when 17 is horizontal (light from the white light source). The percentage change in reflected white light 20 between horizontally and vertically polarized light from 22 is larger than the percentage change in transmitted light through 15. Therefore, the ratioed spectrum for the exact case shown in FIG. 1 has a different intensity scale than the ratioed spectrum where 15 has vertical polarization and 22 has horizontal polarization. The normalization factor between the two methods is obtained from the ratio of white light intensity when 22 is horizontal to when 22 is vertical.

Figure 3:
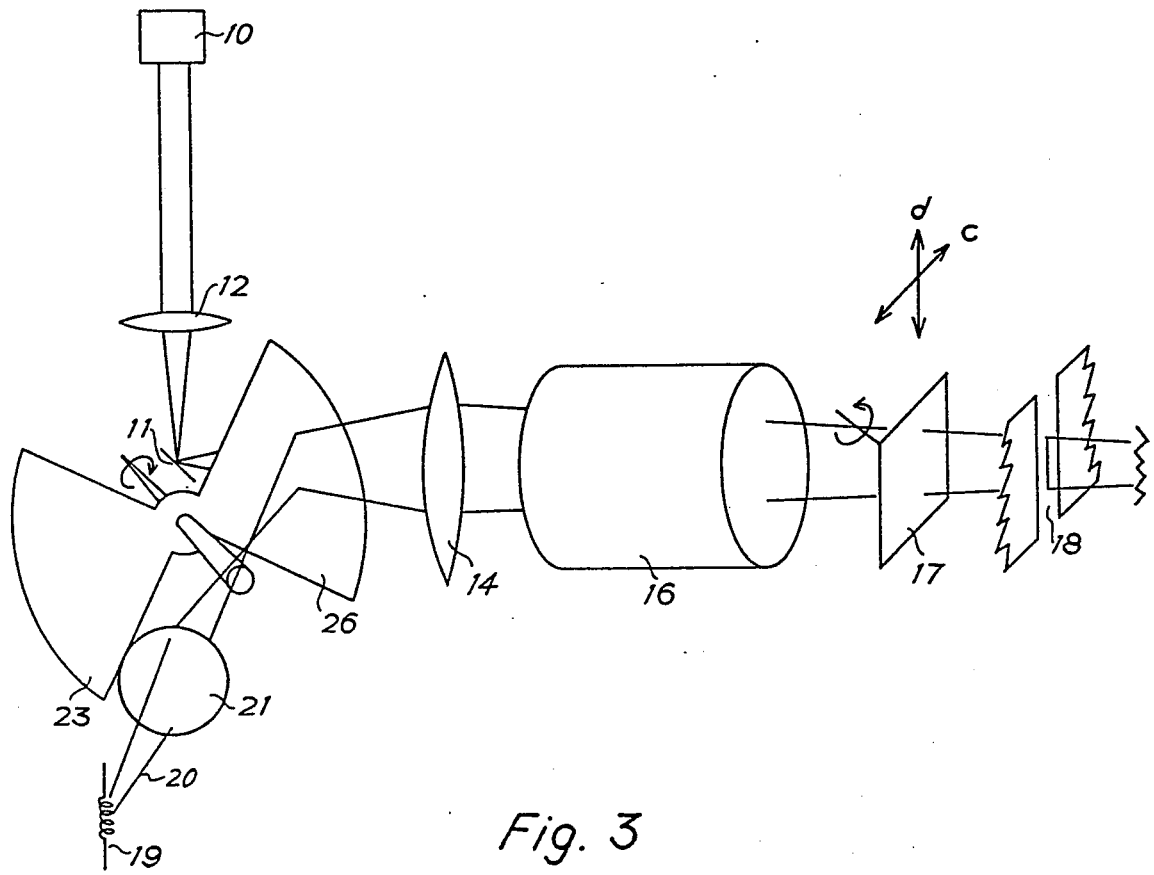
FIG. 3 is a diagrammatic sketch of an alternate embodiment of the invention.

FIG. 3 shows an alternate embodiment of the invention in which the scattered light 13 from the sample (11) and the light from the white light source (19) are alternately passed through lens 14 and filter 16. Chopper 26 having a combination of open and mirrored surfaces is positioned between the sample and 14 and lens 21 and 14 at an angle approximately 45 degrees to the spectrometer optic axis. The open surface of 26 allows 13 to pass to lens 14 and the mirrored surfaces reflect 20 to lens 14. Other methods of alternating the light in accordance with the invention such as the use of rotating or vibrating devices, will be suggested to the skilled artisan with a knowledge of the teaching contained herein. The light (11 and 20) from both sources is intercepted by 17 as it exits filter 16. In this embodiment of the invention 17 analyzes the light, i.e., separates the light into its horizontally polarized and vertically polarized components. Consequently, it is not necessary to make separate measurements of the aforementioned components as described and represented in FIGS. 1 and 2.

The light exiting from 17 passes to slit 18 and is diffracted, detected, stored, ratioed, and displayed as described above.

Having thus described the invention, what is claimed is:

1. A method of obtaining by means of optical components a high resolution scattering spectrum from irradiation of a sample without disturbing the position of the sample, said spectrum being free of artifacts due to the presence of optical components which distort the intensities of the scattered spectrum, which comprises
    (a) irradiating the sample with monochromatic light to produce scattered light,
    (b) simultaneously passing the scattered light from the sample and light from a white light source of known emissivity through the optical components,
    (c) selectively intercepting the light from the white light source and the scattered light from the sample,
    (d) dispersing into a plurality of wavelengths the scattered light from the sample and the light from the white light source,
    (e) measuring at each wavelength through the optical components the intensities of the scattered light from the irradiated sample and the light from the white light source, (f) ratioing the so-measured light intensities from the irradiated sample and the white light source to yield a light intensity at each wavelength representative solely of the scattered light from the irradiated sample, and (g) displaying the so-ratioed light intensity as a function of wavelength.

2. The method of claim 1 wherein the light from the white light source of known emissivity is passed through a polarizer prior to passing through the optical components.

3. The method of claim 2 wherein the optical components include an optical filter.

4. The method of claim 3 wherein said optical filter is a cell containing hot iodine vapor.

5. The method of claim 3 wherein
the scattered light from the irradiated sample is passed through a polaroid beam combiner positioned between the irradiated sample and the optical filter at an angle approximately 45 degrees to the optic axis and
the light from the white light source is reflected from said polaroid beam combiner through the optical filter.

6. The method of claim 1 wherein the optical components include a computer controlled analyzer which selectively intercepts the scattered light from the irradiated sample and the light from the white light source.

7. The method of claim 1 wherein the sample is irradiated by an Argon Laser and the artifacts include stray light due to intense Rayleigh scattering.

8. An apparatus for obtaining by means of optical components a high resolution scattering spectrum from irradiation of a sample without disturbing the position of the sample, said spectrum being free of artifacts due to the presence of said optical components, which comprises in combination (a) means for irradiating the sample with monochromatic light to produce scattered light, (b) means for collecting the scattered light from the irradiated sample, (c) a white light source of known emissivity, (d) means for polarizing the light from the white light source, (e) means for passing the scattered light from the irradiated sample and the light from the white light source simultaneously through the optical components, (f) means for dispersing into a plurality of wavelengths the so-passed scattered light and light from the white light source, (g) means for selectively measuring at each wavelength the intensities of the scattered light from the sample and the light from the white light source, (h) means for ratioing the so-measured light intensities from the irradiated sample and the white light source to yield light intensities representative solely of the scattered light from the irradiated sample, (i) means for storing the so-ratioed light intensities, and (j) means for displaying the so-ratioed light intensities as a function of wavelength.

9. The apparatus of claim 8 which further includes an optical filter.

10. The apparatus of claim 9 wherein the optical filter is a cell containing hot iodine vapor.

11. The apparatus of claim 9 wherein the means for passing the scattered light from the sample and the light from the white light source through the optical components includes a polaroid beam combiner positioned between the sample and the optical filter at an angle approximately 45 degrees to the optic axis.

* * * * *

UNITED STATES PATENT AND TRADEMARK OFFICE
CERTIFICATE OF CORRECTION

PATENT NO. : 4,239,390

DATED : December 16, 1980

INVENTOR(S) : James R. Scherer

It is certified that error appears in the above—identified patent and that said Letters Patent is hereby corrected as shown below:

Column 1, line 46, cancel the word "on" and insert -- or --.

Signed and Sealed this

Fourteenth Day of April 1981

[SEAL]

Attest:

RENE D. TEGTMEYER

Attesting Officer     Acting Commissioner of Patents and Trademarks